US008799700B2

(12) United States Patent
Arumugham et al.

(10) Patent No.: US 8,799,700 B2
(45) Date of Patent: Aug. 5, 2014

(54) PROVIDING FAULT-TOLERANT SPREAD SPECTRUM CLOCK SIGNALS IN A SYSTEM

(75) Inventors: Rangaswamy Arumugham, Plano, TX (US); Stuart Haden, Lucas, TX (US); Mark A. Shaw, Sachse, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 13/379,276

(22) PCT Filed: Jul. 31, 2009

(86) PCT No.: PCT/US2009/052349
§ 371 (c)(1),
(2), (4) Date: Dec. 19, 2011

(87) PCT Pub. No.: WO2011/014178
PCT Pub. Date: Feb. 3, 2011

(65) Prior Publication Data
US 2012/0117415 A1    May 10, 2012

(51) Int. Cl.
| G06F 11/00 | (2006.01) |
| G06F 1/10 | (2006.01) |
| G06F 11/16 | (2006.01) |
| G06F 11/20 | (2006.01) |

(52) U.S. Cl.
CPC ............ G06F 11/1604 (2013.01); G06F 11/20 (2013.01); G06F 11/004 (2013.01); G06F 1/10 (2013.01)
USPC .................................. 714/2; 714/4.11; 714/34

(58) Field of Classification Search
USPC ............................................ 714/2, 4.11, 34
See application file for complete search history.

(56) References Cited

U.S. PATENT DOCUMENTS

| 6,791,382 B1 | 9/2004 | Ting et al. | |
| 7,562,247 B2* | 7/2009 | Baker et al. | 714/2 |
| 8,161,311 B2* | 4/2012 | Wiebe | 713/500 |
| 2003/0081653 A1 | 5/2003 | Hardin et al. | |
| 2003/0118080 A1 | 6/2003 | Hailey | |
| 2005/0135523 A1 | 6/2005 | Carballo | |
| 2007/0194817 A1 | 8/2007 | Decker et al. | |
| 2007/0217481 A1 | 9/2007 | Ko et al. | |
| 2007/0294561 A1 | 12/2007 | Baker et al. | |
| 2009/0055676 A1* | 2/2009 | Wiebe | 713/501 |

FOREIGN PATENT DOCUMENTS

| CN | 101411064 | 4/2009 |
| JP | 2005-223770 | 8/2005 |
| JP | 2005-533404 | 11/2005 |
| JP | 2007-243601 | 9/2007 |
| JP | 2008-301482 | 12/2008 |

OTHER PUBLICATIONS

EPO, Office Action dated Jul. 15, 2013, EP App. No. 09847921.5.

* cited by examiner

*Primary Examiner* — Charles Ehne

(57) ABSTRACT

To provide fault-tolerant, spread spectrum clock signals, a plurality of processing modules having respective spread spectrum control circuits are provided. Clock signals of redundant clock sources are provided to the plurality of processing modules. Failover control logic selects a corresponding one of the clock signals from the redundant clock sources for use in each of the processing modules. Frequency spreading is applied to the corresponding selected clock signal in each of at least some of the plurality of processing module.

15 Claims, 4 Drawing Sheets ived clock signals in the processing modules 102 can be achieved, which can result in reduced EM emissions. The overall system EM emissions are a function of the peak level of received clock signals (with spread spectrum) in each of the processing modules 102.

PROVIDING FAULT-TOLERANT SPREAD SPECTRUM CLOCK SIGNALS IN A SYSTEM

BACKGROUND

High performance computer systems may utilize multiple processors to increase processing power. Processing workloads can be divided and distributed among the processors to reduce execution time and increase performance. A multiprocessor system can be formed of multiple nodes or cells, where each node or cell includes one or more processors, memory, and input/output (I/O) devices.

Reliability and reduced electromagnetic emissions are issues that system designers continually grapple with when designing high performance computer systems.

CROSS REFERENCE TO RELATED APPLICATIONS

The present application claims priority from PCT/US2009/052 349 filed on Jul. 31, 2009 by Rangaswamy Arumugham et al, and entitled PROVIDING FAULT-TOLERANT SPREAD SPECTRUM CLOCK SIGNALS IN A SYSTEM.

BRIEF DESCRIPTION OF THE DRAWINGS

Some embodiments of the invention are described with respect to the following figures.

DETAILED DESCRIPTION

Figure 1:
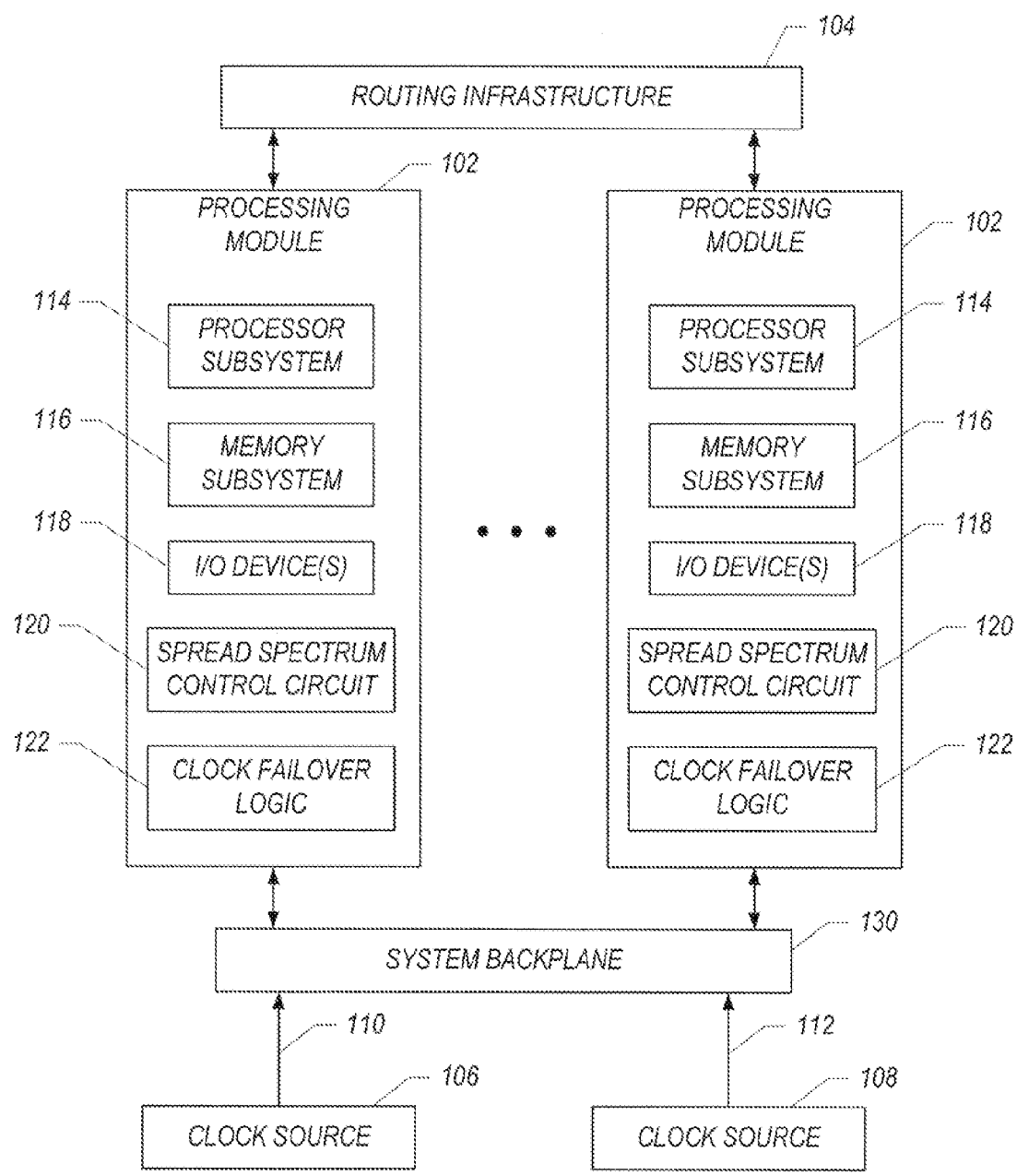
FIG. 1 is a block diagram of an exemplary system including multiple processing modules and redundant clock sources, according to an embodiment.

FIG. 1 illustrates an exemplary system that includes multiple processing modules 102 that are interconnected by a routing infrastructure 104 for communicating data and signals. The routing infrastructure 104 includes communications lines and switches (e.g., cross-bar switches). The "processing modules" of the system can be processor cells, computer nodes, or any other type of assembly that includes electronic components. The system that contains the processing modules 102 can be a computer system, storage system, communications system, or any other type of electronic system.

In some implementations, the system of FIG. 1 has a set of reliability, availability, and serviceability (RAS) features to allow for un-interrupted lifetime operation. For example, redundant power sources and other system infrastructure (e.g., redundant network connections, system management features, etc.) can be provided. Also, failures at the processing module level can be dealt with by partitioning or assigning a group of processing modules 102 for a particular application (such that the application can continue to execute on remaining processing module(s) of the group in case one or more processing modules of the group fail). The system of FIG. 1 is a scalable system since processing modules 102 can be added or removed. Also, the processing modules 102 can be included in one or multiple enclosures for further flexibility.

For clock fault tolerance, the system shown in FIG. 1 also has multiple redundant clock sources 106, 108, which provide redundant clock signals 110, 112 routed over multiple redundant clock distribution paths through a system backplane 130 (or other type of interconnect structure) to the processing modules 102. The redundant clock sources enable failover support in case of failure of a clock source or a signal output from the clock source.

Each of the clock sources 106, 108 is a global clock source that provides clock signals to multiple processing modules 102. In certain implementations, it is desirable that clock signals from a common clock source be received by multiple processing modules to reduce clock skew, which may cause failure during execution of operating systems in the respective processing modules 102. By using a global clock source, minimum clock skew can be experienced at the processing modules 102.

As shown in FIG. 1, each processing module 102 includes clock failover logic 122 that monitors clock signals from the clock sources 106, 108. In response to detecting failure of the one of the clock signals, the clock failover logic 122 performs failover to the other clock signal.

As further shown in FIG. 1, each processing module 102 includes a processor subsystem 114, memory subsystem 116 (which can include one or more disk-based storage devices and/or integrated circuit or semiconductor memory devices), and input/output (I/O) device(s) 118.

In addition, each processing module 102 includes an individually-controllable spread spectrum control circuit 120 that is configured to apply frequency spreading (such as frequency dithering) to a selected clock signal (a selected one of the clock signals 110, 112 provided by the clock sources 106, 108). Spread spectrum refers to a technique in which electromagnetic (EM) energy (in this case the energy of the selected clock signal) is spread in the frequency domain. One way of achieving this according to some embodiments is to apply frequency dithering to the selected clock signal, where frequency dithering refers to varying the frequency of the clock signal over a defined range at a given rate.

By employing the spread spectrum control circuits 120 and clock failover logic 122 according to some embodiments, the challenge of incorporating clock spread spectrum in a system that includes redundant global clock sources with a failover mechanism is addressed. Conventionally, adding clock spread spectrum in a context that includes fault-tolerant global clock sources is not feasible due to various issues.

The spread spectrum control circuits 120 in corresponding processing modules 102 are independently controllable and settable, such that the frequency spreading applied in the different processing modules 102 may be different, if desired. For example, different clock ditherings can be applied in different processing modules. The frequency dithering applied in a first processing module may use a different range and rate than the frequency dithering applied in a second processing module, for example. The characteristics of the applied frequency spreading in each of the processing modules 102 can be based on configuration parameters applied to the corresponding spread spectrum control circuits 120. For example, the spread spectrum configuration parameters, customized for each processing module 102, may be stored in a non-volatile memory attached to and accessible by the corresponding spread spectrum control circuit 120. Alternatively, the spread spectrum control circuit 120 of each processing module 102 may be individually programmable by using a manageability port in the system.

By applying different frequency ditherings in the respective processing modules 102, a reduction in the peak level of EM emissions can be achieved, since different processing modules 102 may be operating at different frequencies at any given time. Government regulations place thresholds on the peak energy level of EM emissions from a system.

Some of the components of the processing modules 102 may multiply the frequency of the input clock signals to much higher frequencies for internal operations of these components. For example, a reference clock signal may be in the range of 100 to 400 MHz (megahertz). Multiplication of clock frequency performed in some components may produce internal clocks in the range of 1 to 5 GHz (gigahertz) or higher. The production of such high-frequency internal clock signals results in generation of radiationally efficient harmonic energies that can manifest in elevated EM emissions.

By using the spread spectrum control circuits 120 in corresponding processing modules, the energies of EM emissions can be spread over a broader bandwidth such that the likelihood of the system complying with regulatory standards increases. The spread spectrum control circuits 120 allow dithering to be localized such that the instantaneous frequencies of the clock signals in corresponding processing modules 102 are randomized and as a result, lower peak emission levels are achieved.

The ability to individually control the spread spectrum controls circuits 120 also allows any one of the spread spectrum control circuits 120 to be disabled if desired, such as for a particular processing module 102 that contains components that do not tolerate frequency dithering well.

In a further embodiment, each spread spectrum control circuit 120 can output multiple clock outputs based on an input clock signal (from one of the clock sources 106, 108). The multiple clock outputs from the spread spectrum control circuit 120 can have different spread spectrum settings applied depending upon tolerance levels of the individual components (e.g., the processor subsystem 114, memory subsystem 116, and I/O device(s) 118) in the processing module 102 that receive the corresponding clock outputs. Some of the components in the processing module 102 may be able to tolerate frequency dithering better than other components. For certain components, the clock outputs provided by the spread spectrum control circuit 120 can even be disabled.

The independently controllable spread spectrum control circuits 120 are provided in the context of a system that also provides clock redundancy in the form of redundant clock sources 106, 108. Employing redundant clock sources 106, 108 avoids a single point of failure. It is noted that failure can occur either in the clock sources 106, 108 themselves, or in the communications path from the clock source 106 or 108 to the processing module 102. Although just two clock sources 106, 108 are depicted in FIG. 1, it is noted that other implementations may employ additional clock sources. In case of failure of a particular clock signal from a clock source, failover can be performed from a first clock signal of one of the clock sources 106, 108 to another clock signal associated with the other one of the clock sources 106, 108.

Figure 2:
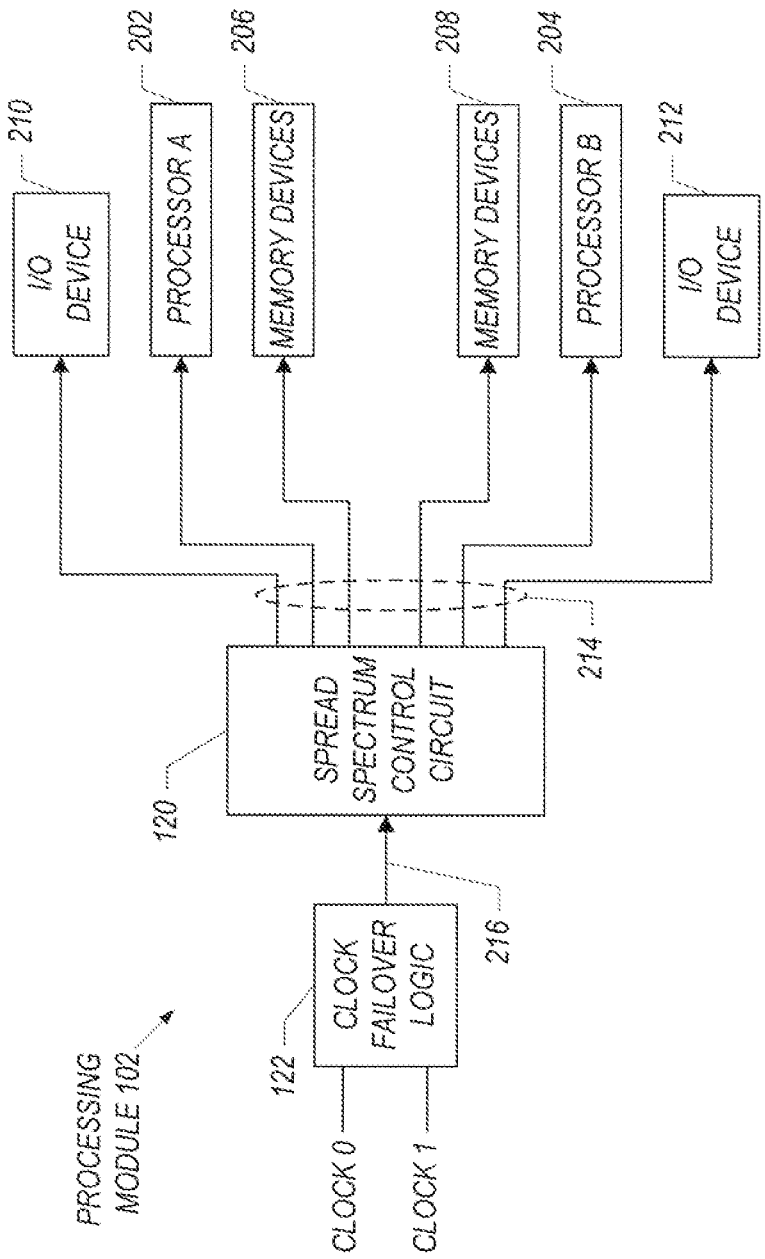
FIG. 2 is a block diagram of a processing module, according to an embodiment.

FIG. 2 illustrates components in a processing module 102 according to an example. Two processors 202 and 204 are shown, where these two processors 202, 204 are part of the processor subsystem 114 shown in FIG. 1. Moreover, memory devices 206 and 208 are shown, where the memory devices 206, 208 are part of the memory subsystem 116 shown in FIG. 1.

In addition, I/O devices 210, 212 are provided, which correspond to the I/O device(s) 118 shown in FIG. 1. In one example, the I/O devices 210, 212 can be implemented with application specific integrated circuit (ASIC) devices. In other implementations, the I/O devices 210, 212 can be implemented with other types of integrated circuit devices.

The arrangement of the various components of the processing module 102 shown in FIG. 2 is provided for purposes of example. In other implementations, other arrangements of components can be employed.

The spread spectrum control circuit 120 in the processor module 102 produces clock outputs 214 that are routed to corresponding different ones of the components shown in FIG. 2. Note that the different clock outputs 214 provided to different types of components can have different spread spectrum settings applied. In fact, some of the clock outputs 214 may have spread spectrum disabled—for example, no clock dithering is applied to such clock outputs. In this manner, components of the processing module 102 that do not tolerate clock frequency spreading well can have clock outputs provided to such components disabled. However, for clock outputs provided to other components of the processing module 102, different frequency dithering settings can be applied depending upon tolerance levels of such other components.

The clock outputs 214 from the spread spectrum control circuit 120 are produced from an input clock signal 216, which is provided by the clock failover logic 122. The clock failover logic 122 receives two clock signals: CLOCK0 and CLOCK1. The CLOCK0 signal can be received from the clock source 106, while the CLOCK1 signal is received from the clock source 108. The clock failover logic 122 includes a monitoring device that monitors the two input clock signals for failure or degradation of the clock signals. For example, if CLOCK0 is considered the primary input clock signal, and CLOCK1 is considered the secondary input clock signal, then the clock failover logic 122 will monitor the primary clock signal CLOCK0 to detect for failure or degradation. If such failure or degradation is detected, then the clock failover logic 122 performs failover to the secondary clock signal CLOCK1 (such that CLOCK1 is output as clock signal 216 instead of CLOCK0).

Figure 3:
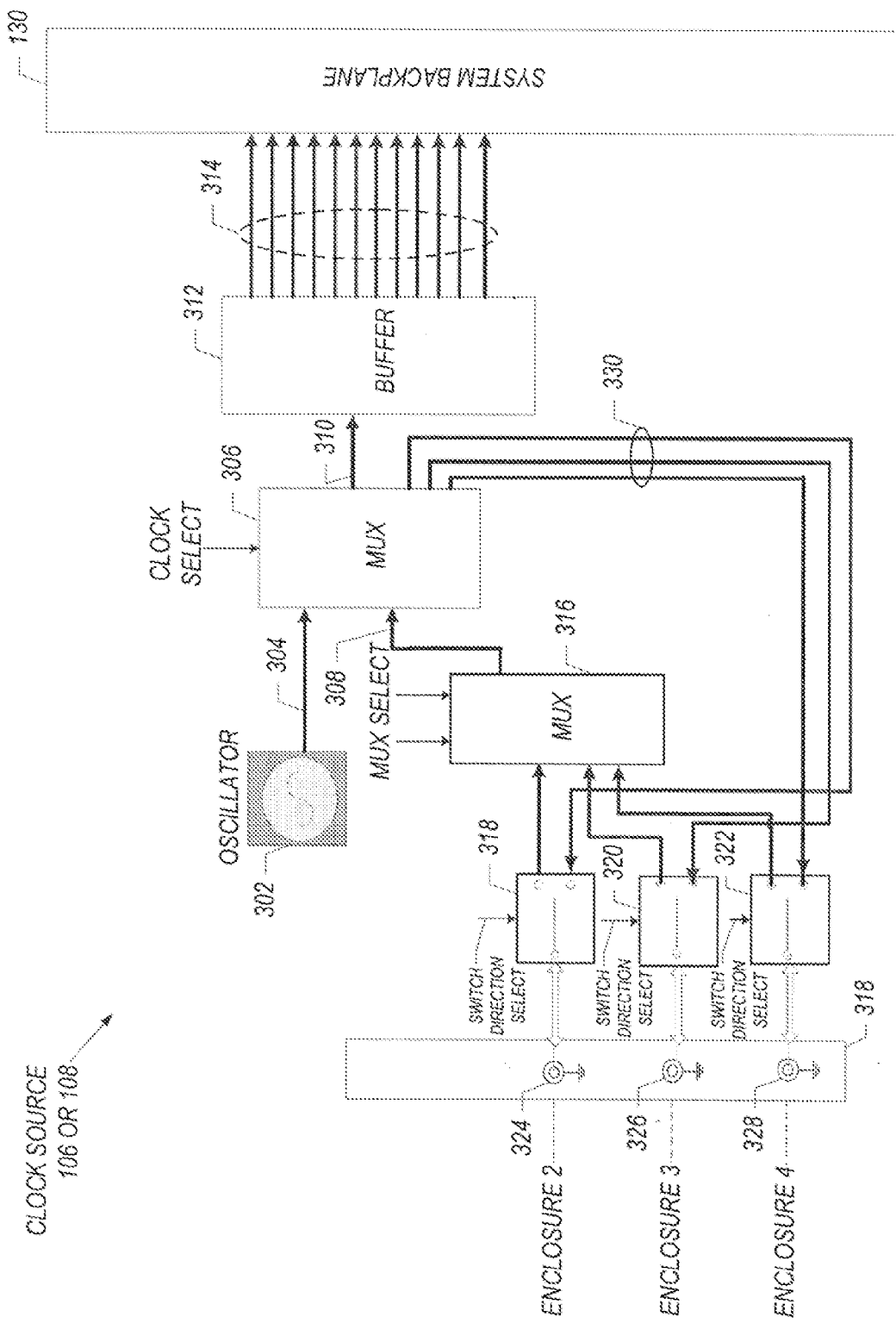
FIG. 3 is a block diagram of a clock source used in an arrangement according to an embodiment.

FIG. 3 is a block diagram of an exemplary arrangement of a clock source (106 or 108 in FIG. 1). The clock source 106 or 108 includes an oscillator 302, which provides an oscillating signal 304 to one input of a multiplexer 306. The multiplexer 306 receives at its other input an oscillating signal 308 that is output by another multiplexer 316 (discussed further below).

The multiplexer 306 selects either the oscillating signal 304 or the oscillating signal input 308 for output as clock signal 310 to a buffer 312. The buffer 312 produces multiple copies (314) of the clock signal 310 for communication over the system backplane 130.

The copies 314 represent identical copies of a selected one of a local oscillator output or an external oscillator output (where selection of an external oscillator output is described below). In some implementations, the number of copies equals to the number of processing modules 102. Each of clock sources 106 and 108 generates the same number of clock signal copies for transport over the system backplane 130 to the processing modules 102.

In the example implementation of FIG. 3, it is assumed that the clock source 106 or 108 is part of a multi-enclosure system. In such a system, the arrangement of FIG. 1 can be in one enclosure, while other enclosures can include other arrangements of processing modules and clock sources. The multiple enclosures can each include multiple processing modules. The size of the buffer 312 for outputting the clock signal copies 314 is selected according to the expected loading. In the implementation of FIG. 3, four enclosures are assumed. However, in other configurations, different numbers of enclosures can be used. Moreover, instead of using two global clock sources with corresponding oscillators, different numbers of redundant clock sources can be used in other implementations.

Circuitry is provided in the clock source 106 or 108 to allow the clock source 106 or 108 to receive oscillating signals from other enclosures for use in the clock source 106 or 108. The circuitry also allows the oscillating signal 304 from the oscillator 302 to be routed (through the multiplexer 306), paths 330, switches 318, 320, 322, and a connector structure 318.

The connector structure 318 includes ports 324, 326, and 328 that connect to respective enclosures 2, 3, and 4 (with the assumption that the clock source 106 or 108 is in enclosure 1). The switches 318, 320, and 322 are bi-directional switches that allow either oscillating signals to be input from enclosures 2-4 into the clock source 106 or 108, or to allow the oscillating signal 304 of the oscillator 302 to be output to the other enclosures. The direction of switching is controlled by a Switch Direction Select signal.

Assuming that the switches 318, 320, and 322 are set to route oscillating signals from other enclosures into the clock source 106 or 108, such oscillating signals from the other enclosures are provided to respective inputs of the multiplexer 316, which selects one of such oscillating signals to output as oscillating signal 308 that is provided to the multiplexer 306.

On the other hand, if the switches 318, 320, and 322 are set to output oscillating signal 304 of the clock source 106 or 108 to the other enclosures, then the oscillating signal 304 is provided over paths 330 through switches 318, 320, and 322 to respective ports 324, 326, and 328 of the interconnect structure 318.

In other implementations, the circuitry for routing oscillating signals from other enclosures to the clock source 106 or 108, or for routing the oscillating signal of the clock source 106 or 108 to the other enclosures, can be omitted.

Figure 4:
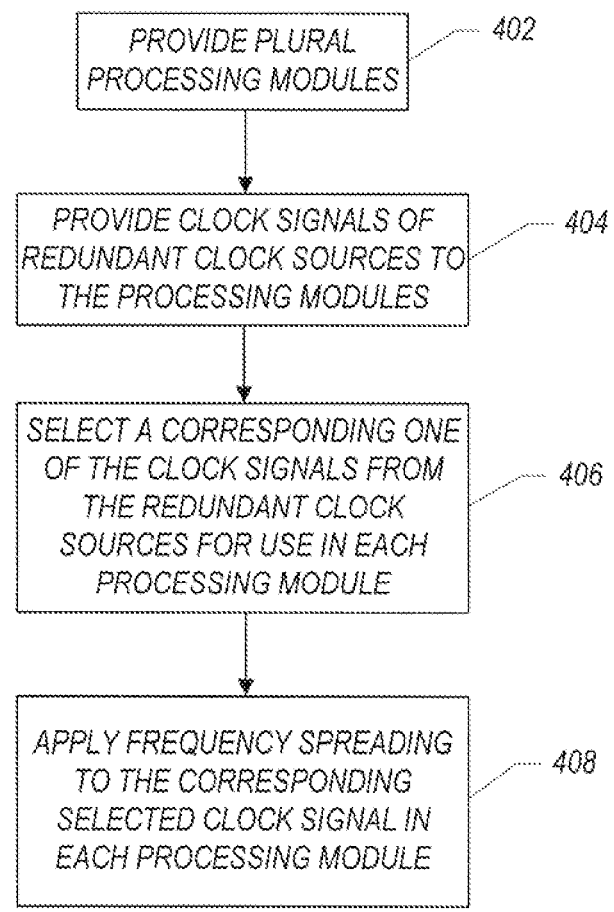
FIG. 4 is a flow diagram of a process according to an embodiment.

FIG. 4 is a flow diagram of a general process according to an embodiment. Plural processing modules 102 having respective spread spectrum control circuits 120 are provided (at 402). Clock signals of the redundant clock sources 106, 108 are provided (at 404) to the plural processing modules 102. In each processing module, a corresponding one of the clock signals from the redundant clock sources for use in the processing module is selected (at 406) by the clock failover logic 122. Frequency spreading is then applied (at 408) to the corresponding selected clock signal in each processing module 102.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system in which is provided fault-tolerant, spread spectrum clock signals, comprising:
a plurality of processing modules provided in one or more enclosures, wherein the processing modules include corresponding clock spread spectrum control circuits; and
a plurality of redundant clock sources providing respective clock signals to the plurality of processing modules,
wherein each of the clock spread spectrum circuits is configured to apply frequency spreading to a corresponding selected one of the clock signals, and
wherein each of the processing modules includes a failover control logic to monitor clock signals from the redundant clock sources to perform clock signal failover, and
wherein at least a particular one of the spread spectrum circuits is to receive one of the clock signals and to produce at least a first clock output, wherein frequency spreading is disabled for the first clock output.

2. The system of claim 1, wherein the particular spread spectrum control circuit is to further generate a second clock output, wherein frequency spreading is enabled for the second clock output.

3. The system of claim 2, wherein the particular spread spectrum control circuit is to generate a third clock output, wherein frequency spreading is also enabled for the third clock output, and wherein settings of the frequency spreading applied to the second and third clock outputs are different.

4. The system of claim 1, wherein settings of the frequency spreading applied by at least two of the spread spectrum control circuits are different.

5. The system of claim 4, wherein a setting of the frequency spreading applied by each of the at least two of the spread spectrum control circuits is stored in a non-volatile memory accessible by the corresponding spread spectrum control circuit; or programmed through a manageability port.

6. The system of claim 4, wherein the frequency spreading includes frequency dithering that involves varying a frequency of a corresponding selected clock signal over a predefined range at a given rate, wherein the different settings include using one or more of different predefined ranges and given rates.

7. The system of claim 1, wherein the spread spectrum control circuits are independently controllable.

8. The system of claim 1, wherein the clock failover control logic is to effect failover from a clock signal of a first of the redundant clock sources to a clock signal of a second of the redundant clock sources in response to detecting failure or degradation of the clock signal of the first redundant clock source.

9. A method of providing fault-tolerant, spread spectrum clock signals, comprising:
providing a plurality of processing modules having respective spread spectrum control circuits;
providing clock signals of redundant clock sources to the plurality of processing modules;
selecting, by failover control logic, a corresponding one of the clock signals from the redundant clock sources for use in each of the processing modules; applying frequency spreading to the corresponding selected clock signal in each of at least some of the plurality of processing module; and
producing a first clock output when at least a particular one of the spread spectrum circuits receives one of the clock signals, wherein frequency spreading is disabled for the first clock output.

10. The method of claim 9, further comprising:
in a particular one of the plurality of processing modules, failing over, by the failover control logic, from the corresponding selected clock signal from one of the redundant clock sources to another clock signal from another one of the redundant clock sources.

11. The method of claim 9, further comprising:
in a particular one of the plurality of processing modules, providing multiple output clock signals from the corresponding spread spectrum control circuit, wherein the multiple output clock signals are provided to different components in the particular processing module, and wherein different spread spectrum settings are used for the multiple output clock signals.

12. The method of claim 9, further comprising:
independently controlling spread spectrum settings of the spread spectrum control circuits in corresponding processing modules.

13. A first processing module for use in a system having multiple processing modules, comprising:
a clock failover logic to receive clock signals from plural clock sources and to select one of the plural clock signals for use in the processing module;
a spread spectrum control circuit to
receive the selected clock signal and to apply frequency spreading to the selected clock signal, wherein the spread spectrum control circuit is independently controllable from at least another spread spectrum control circuit provided in another one of the multiple processing modules; and
receive one of the clock signals and produce at least a first clock output, wherein frequency spreading is disabled for the first clock output.

14. The first processing module of claim 13, wherein the spread spectrum control circuit is to output multiple clock outputs based on the selected clock signal, wherein the multiple clock outputs have different frequency spreading settings.

15. The first processing module of claim 13 wherein the spread spectrum control circuit is to generate a second clock output, wherein frequency spreading is enabled for the second clock output.

* * * * *

UNITED STATES PATENT AND TRADEMARK OFFICE
CERTIFICATE OF CORRECTION

| | |
|---|---|
| PATENT NO. | : 8,799,700 B2 |
| APPLICATION NO. | : 13/379276 |
| DATED | : August 5, 2014 |
| INVENTOR(S) | : Rangaswamy Arumugham et al. |

It is certified that error appears in the above-identified patent and that said Letters Patent is hereby corrected as shown below:

In the Specification

In column 1, line 3, above "BACKGROUND"
insert -- CROSS REFERENCE TO RELATED APPLICATIONS
The present application claims priority from PCT/US2009/052349 filed on Jul. 31, 2009 by Rangaswamy Arumugham et al, and entitled PROVIDING FAULT-TOLERANT SPREAD SPECTRUM CLOCK SIGNALS IN A SYSTEM. --.

In column 1, lines 17-25, below "computer systems."
delete "CROSS REFERENCE TO RELATED APPLICATIONS
The present application claims priority from PCT/US2009/052 349 filed on Jul. 31, 2009 by Rangaswamy Arumugham et al, and entitled PROVIDING FAULT-TOLERANT SPREAD SPECTRUM CLOCK SIGNALS IN A SYSTEM.".

In the Claims

In column 6, lines 26-27, in Claim 5, delete "circuit;" and insert -- circuit --, therefor.

In column 7, line 14, in Claim 13, delete "to" and insert -- to: --, therefor.

Signed and Sealed this
Tenth Day of March, 2015

Michelle K. Lee
*Deputy Director of the United States Patent and Trademark Office*